(No Model.)
C. E. WORLINE.
Plow Attachment.
No. 232,796.            Patented Sept. 28, 1880.
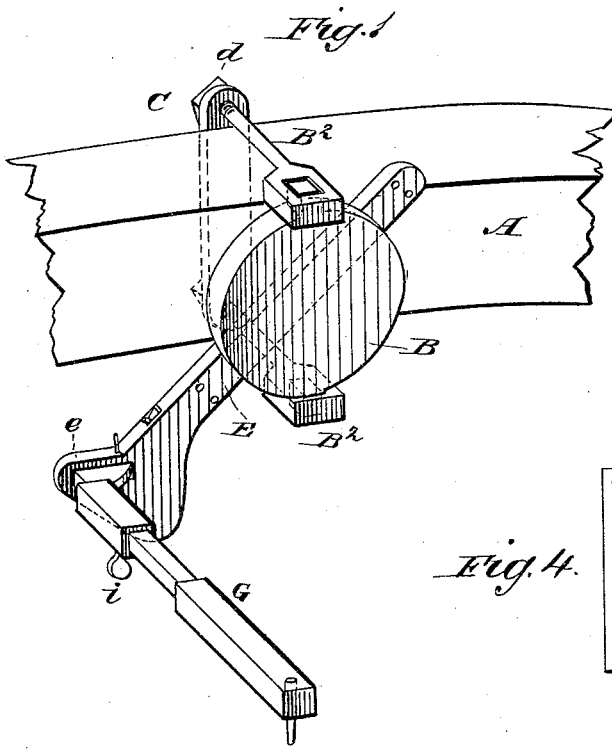
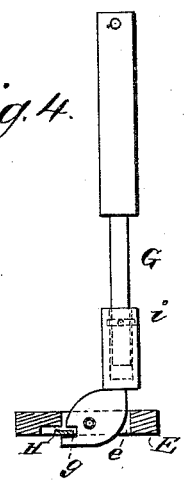
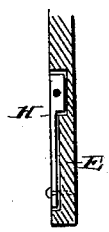
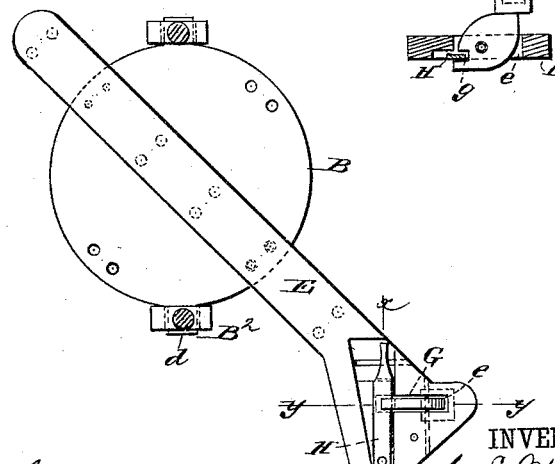
WITNESSES:
Francis McArdle
C. Sedgwick
INVENTOR:
C. E. Worline
BY Munn & Co.
ATTORNEYS.

UNITED STATES PATENT OFFICE.

CHAUNCEY E. WORLINE, OF RADNOR, OHIO.

PLOW ATTACHMENT.

SPECIFICATION forming part of Letters Patent No. 232,796, dated September 28, 1880.

Application filed July 28, 1880. (No model.)

*To all whom it may concern:*

Be it known that I, CHAUNCEY E. WORLINE, of Radnor, in the county of Delaware and State of Ohio, have invented a new and useful Improvement in Plow-Beam Attachments, of which the following is a specification.

My invention consists in a novel construction and combination, with a plow-beam, of a clevis, a pivoted bar, a spring, and a supporting and carrying arm, whereby provision is made for raking and leveling weeds, stubble, corn-stalks, and grass during the process of plowing a field, and for allowing the raking-bar to yield when meeting obstructions, and to automatically adjust itself after passing the same.

In the accompanying drawings, Figure 1 is a perspective view illustrating my invention. Fig. 2 is a side view, partly in vertical section. Figs. 3 and 4 are detail sectional views.

Similar letters of reference indicate corresponding parts.

A represents a plow-beam of any ordinary description. B B² is a clevis, consisting of a circular plate and two arms, which may be all in one piece or in two or more pieces, as may be desired. The arms B² extend at right angles to the surface of the plate B, and have their ends screw-threaded.

C is a bar, provided near its ends with holes which fit over the screw-threaded ends of the arms B².

The plow-beam A passes through the clevis B B², which is so arranged that the plate B will occupy a vertical position on one side of the plow-beam, with the arms B² above and below said beam, and the bar C is placed on the side of the beam opposite the plate B, and held in place by means of nuts $d$.

The plate B is provided with eight holes, arranged in four pairs, on its inner side, for the reception of pins, as hereinafter described.

E is an arm, provided with holes arranged in pairs for engagement with the pins held by the holes in the plate B. This arm is clamped between the plow-beam and the plate B, and by means of the holes in said arm and said plate and the pins engaging with said holes the arm may be raised or lowered or adjusted at different angles of inclination from a vertical position.

At the lower end of the arm E is a slot, $e$, in which is pivoted one end of a bar, G, which is rounded on its edge and provided with a notch, $g$, which engages with a flat spring, H, carried by the arm E, as shown in Figs. 2, 3, and 4. The bar G is preferably telescopic, as shown, so that its length may be increased or diminished at pleasure, according to the desired distance between the furrows to be plowed, the telescopic portions being provided with screws $i$.

As the plow is drawn along the bar G rakes and levels the weeds, corn-stalks, and other rubbish, so that they may be plowed in and covered up by the plow. When the bar G meets with a rigid obstruction the spring H allows it to yield and to move backward and upward, and when the obstruction is passed the bar falls again of its own weight and is held in place by the engagement of the notch $g$ with the spring.

Having thus fully described my invention, I claim as new and desire to secure by Letters Patent—

1. The combination of the plate B, provided with holes arranged in pairs, the arm E, provided with similarly arranged holes, and the pins engaging with said holes, substantially as and for the purpose herein described.

2. The combination of the arm E, provided with the slot $e$, the raking-bar G, pivoted in said slot and provided with the notch $g$, and the spring H, carried by the arm E, substantially as and for the purpose herein described.

CHAUNCEY E. WORLINE.

Witnesses:
  HENRY WORLINE,
  EUNICE WORLINE.